July 19, 1938.     R. H. McKEE     2,124,426
METHOD OF CONTINUOUSLY SEPARATING UNSATURATED HYDROCARBON
GASES FROM SATURATED HYDROCARBON GASES
Filed Jan. 26, 1935     2 Sheets-Sheet 1

INVENTOR.
RALPH H. McKEE
BY
ATTORNEY.

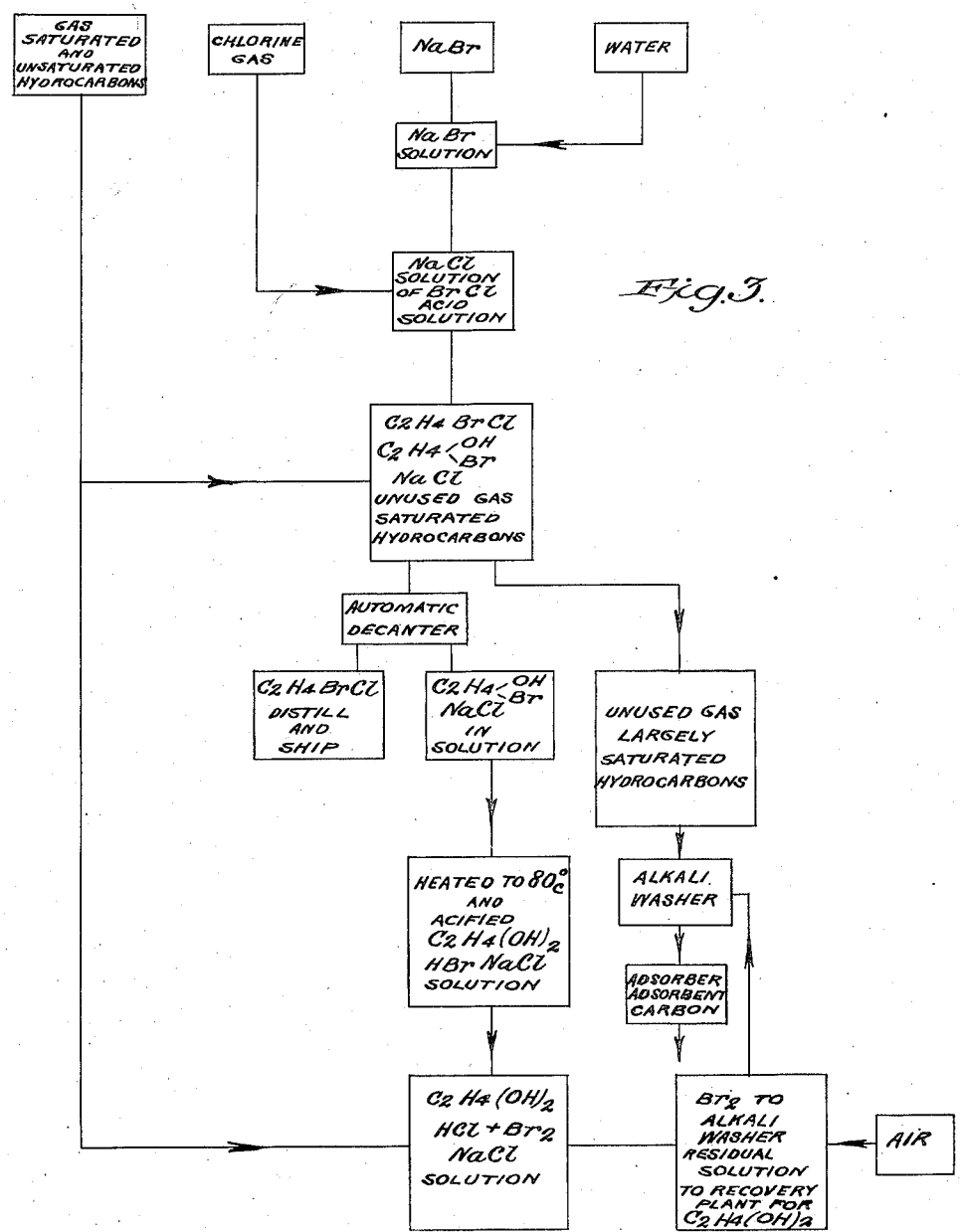

Patented July 19, 1938

2,124,426

UNITED STATES PATENT OFFICE 2,124,426

METHOD OF CONTINUOUSLY SEPARATING UNSATURATED HYDROCARBON GASES FROM SATURATED HYDROCARBON GASES

Ralph H. McKee, New York, N. Y., assignor to Cesare Barbieri, New York, N. Y.

Application January 26, 1935, Serial No. 3,674

14 Claims. (Cl. 260—162)

The present invention relates to an improved method of continuously separating unsaturated aliphatic hydrocarbon gases from saturated aliphatic hydrocarbon gases, especially gases produced in petroleum and similar cracking procedures.

It is well known that heretofore various methods have been used to separate unsaturated hydrocarbons from saturated hydrocarbon gases. The more important methods involved liquefaction and the use of high pressures and low temperatures to liquefy certain of the constituents of the gas mixture and to permit their separation. One of the outstanding systems of this type was the so-called Linde process. As is well known, this process has many disadvantages, of which may be mentioned the high initial investment required for an installation capable of separating unsaturated hydrocarbons from saturated hydrocarbon gases on an industrial scale. Moreover, the necessity for using high pressures and low temperatures required the expenditure of large amounts of energy and involved high operating costs and high maintenance expenses. Various methods were proposed to replace the liquefaction systems. Of these proposals, the sulfuric acid method may be mentioned as probably the most important. In this method, sulfuric acid was used to react chemically with the unsaturated hydrocarbons. In practice, complicated side reactions occurred as well as polymerization. Due to the complications of the process and the corrosive nature of sulfuric acid and the inefficient yields and recoveries, the sulfuric acid process has not been able to replace the so-called Linde liquefaction system which has probably been the most important industrially. Although various procedures have been suggested to replace prior systems, none, as far as I am aware, has been provided which is wholly satisfactory and acceptable in industrial practice.

I have discovered an improved procedure of continuously separating unsaturated from saturated hydrocarbons which overcomes the disadvantages of the prior art and which is very simple to carry into practice without unwanted by-products and loss of halogens.

It is an object of the invention to provide a continuous method of separating unsaturated aliphatic hydrocarbons from saturated aliphatic hydrocarbon gases which can be carried into practice industrially at substantially normal pressures and temperatures with increased yields and with recovery of alkylene halides from exit gases.

It is also within the contemplation of the invention to provide a continuous method of separating unsaturated aliphatic hydrocarbons from saturated aliphatic hydrocarbon gases in a simple apparatus, in which halogens are prevented from dissolving in the manufactured alkylene halide.

The invention also contemplates the provision of a method of separating unsaturated hydrocarbons from saturated hydrocarbons which is susceptible to heat control and which prevents the attainment of excessive temperatures detrimental to high efficiency and high yields.

It is a further object of the invention to provide a continuous method which is economical, which is commercial, and which can be carried into practice on an industrial scale with a minimum production of products formed from saturated hydrocarbons by the action of free halogens.

Other objects and advantages of the invention will become apparent from the following description of preferred procedures taken in conjunction with the accompanying drawings, in which:—

Fig. 3 illustrates a flow sheet of the present process in conjunction with specific agents, gases, etc.

Figure 1:
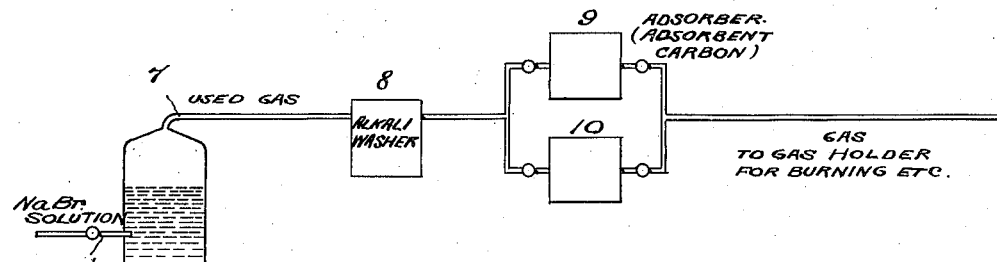
Fig. 1 depicts diagrammatically apparatus adapted to carrying the present process into practice.

The present invention contemplates the continuous treatment of an acidified solution of a halide with gaseous chlorine in excess of stoichiometric quantity to liberate bromine and to form bromine chloride (BrCl) and with a gas containing saturated and unsaturated hydrocarbons to effect substantially complete halogenation of the unsaturated hydrocarbons without halogenating saturated hydrocarbons to any appreciable extent. The treated gases are subjected to absorption and adsorption whereby gaseous bromine and hydrocarbon halides are recovered for re-use and for consolidation and the residual gas containing practically all of the saturated hydrocarbons is in an unaffected condition. In carrying the invention into practice, it is preferred to flow a strong or concentrated salt solution of a halide of an alkali or alkaline earth metal (e. g. sodium bromide) practically continuously through a saturator, preferably in the form of a tower. A stream of chlorine gas and a stream of unsaturated and saturated hydrocarbon gas are flowed practically continuously and countercurrent to said stream of salt solution. The gas streams preferably are introduced into the solution at about the same region and about simultaneously with each other. For best practical results, a small amount of unsaturated and saturated hydrocarbon gas is introduced into the solution at the bottom of the tower adjacent to the outlet from which the halogenated product is withdrawn and the hydrocarbon gas is also introduced into the solution in the upper part of the tower but below the inlet for the halide salt solution. By regulating the amount of chlorine gas admitted to an excess of stoichiometric quantities, bromine is liberated in amounts exceeding its normal solubility in water and in amounts causing the formation of bromine chloride. In this manner, a large amount of halogen is present and the halogenation of the unsaturated hydrocarbons is effected readily and efficiently whereby practically all of the unsaturated hydrocarbons are halogenated and the saturated hydrocarbons remain unaffected. By conducting the foregoing operations in the dark, the possibility of halogenating saturated hydrocarbons is reduced and practically eliminated. For guiding those skilled in the art in regulating the addition of chlorine gas to the acidified salt solution, the addition is continued until the bromine is liberated and the brownish colored bromine solution is rendered colorless thereby assuring the use of chlorine in excess of stoichiometric quantity and the setting free from the alkali or alkaline earth metal of substantially all of the bromine and the formation of bromine chloride. In this manner, an amount of bromine may be provided in the solution in excess of amounts provided heretofore. The heat liberated in the aforesaid reactions can be readily controlled due to the fact that a relatively large amount of water is present in the solution in the tower and due to the use of a cooling jacket (not shown in figures) containing cooling water surrounding the tower.

The used or treated gas is washed with an alkaline solution, preferably a caustic soda solution to recover bromine, chlorine and other halogens. After being washed thoroughly, the gas is passed through an adsorbent, such as activated carbon, to remove hydrocarbon halides which can be subsequently recovered from the carbon as by steaming. The bromine thus recovered can be reused and the adsorbed hydrocarbon halides can be merged with the halogenated product.

The waste salt solution or liquor comprises essentially a sodium chloride solution containing some ethylene bromhydrin, chlorhydrin, etc. For the purpose of recovering the bromhydrin, etc., the waste liquor is run into a large wooden separating tank from which the product is collected and removed. To the residual liquor, acid is added until a pH of about 3 is obtained if the liquor is not already acid to this extent. The acidified liquor is heated to a temperature of approximately 80° C. By permitting the by-products, such as ethylene bromhydrin, ethylene chlorhydrin, etc., to stand in the tank, they are converted by hydrolysis into glycol, hydrobromic acid, hydrochloric acid, etc. After hydrolysis is about complete, a small amount of chlorine can be run into the tank where it will react with hydrobromic acid to liberate bromine. By blowing air into the tank, bromine can be removed and can be recovered in an alkaline solution, such as a sodium carbonate solution. The recovered bromine can be returned to the system for reuse. For recovering the glycol from the salt solution or liquor, conventional methods may be utilized.

Referring more particularly to Fig. 1, the reference character T designates an elongated vertical tower preferably provided with a water jacket. Through inlet 1, a salt solution of a halide of an alkali metal is introduced into the tower and is caused to flow downward. Chlorine gas is added to the solution via inlet 2 and is permitted to flow upward countercurrent to the downward flowing solution. Closely adjacent to the chlorine gas inlet is a second inlet 3 for the introduction of unsaturated and saturated hydrocarbon gases which rise upward simultaneously with and contiguous to the chlorine. By regulating the chlorine in excess of stoichiometric quantity, amounts of bromine may be dissolved in excess of solubility amounts and bromine chloride may be formed. Due to the presence of such excessive amounts of bromine and of bromine chloride, the halogenation of the unsaturated hydrocarbons is very efficient. As the hydrocarbon gases closely follow the stream of chlorine, the unsaturated hydrocarbons are present at practically the instant the bromine is liberated and the bromine chloride is formed.

The halogenated hydrocarbons are liquid and fall to the bottom of the tower. At the bottom, the halogenated product is removed by means of an outlet 4 together with the salt solution or liquor. Closely adjacent to the bottom of the tower, an auxiliary gas inlet 5 is provided for the introduction of hydrocarbon gases to the solution. By adding gas in the region of the outlet any free halogen will react with unsaturated hydrocarbons and will prevent the discharge of free halogens with the product and with the waste solution. In the upper part of the tower and below salt solution inlet 1, a second auxiliary inlet 6 is provided for hydrocarbon gases. This auxiliary gas stream contacts with free halogens. In this manner, unsaturated hydrocarbons react with the free halogens and remove them from the rising gases. By controlling the amount of auxiliary gas, practically all of the free halogens may be used and halogenated product may be produced.

At the top of the tower, a gas outlet 7 is located for the withdrawal of the treated or used gases. Due to the partial vapor pressure of the halogenated hydrocarbons, the vapor of these halogenated products may be present in the exit gases. In addition, the gases may contain some unused free halogens. The exit gases containing some free halogens and some hydrocarbon halides are passed through a washer 8 and are washed with an alkaline solution, such as a caustic soda solution. In this washing operation, practically all of the free halogens are absorbed and are recovered as a halide or halate. From the alkali washer 8, the gases pass through an adsorber 9 containing activated carbon which adsorbs halogenated hydrocarbons and residual free halogens. To recover the halogenated hydrocarbons and the halogens, the activated carbon is steamed. A second adsorber 10 is provided for use while the first adsorber is being steamed. After the adsorption treatment, the exit gases are practically wholly of a saturated character substantially devoid of unsaturated hydrocarbons, free halogens, and halogenated hydrocarbons. The treated exit gases may be passed to a gas holder (not shown) for light, heat, power, and other uses.

Figure 2:
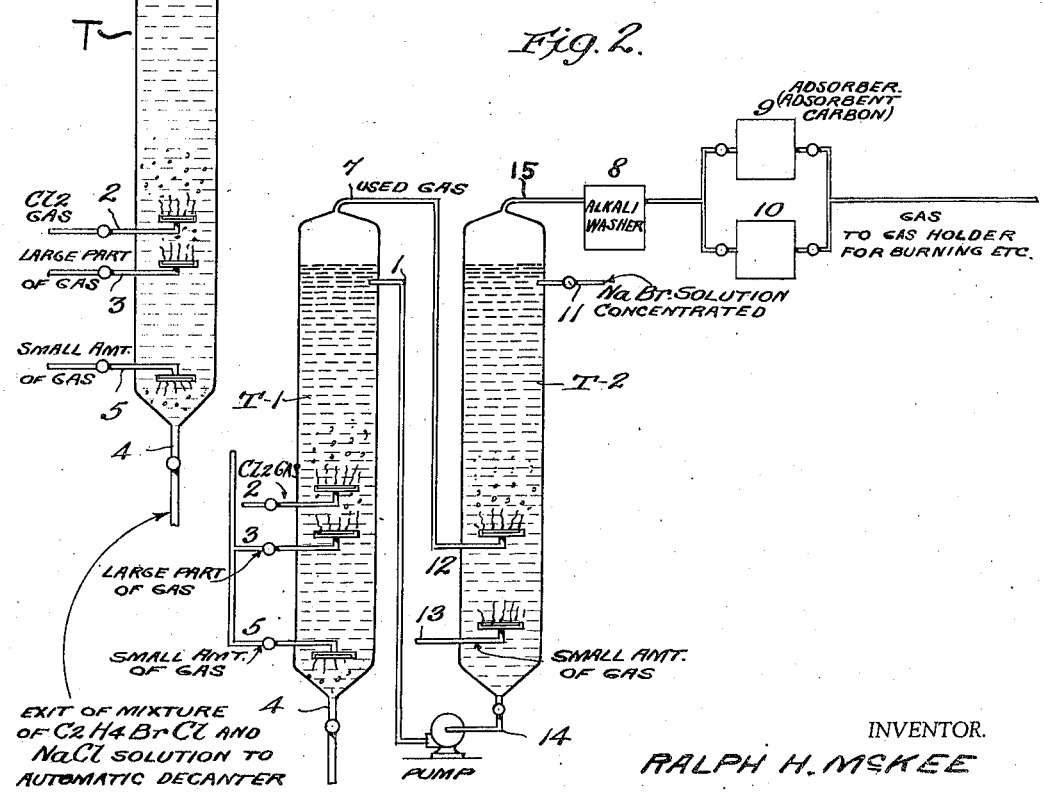
Fig. 2 is similar to Fig. 1 of modified apparatus.

In some instances, it may be desirable to use two towers instead of one tower. A two tower system is illustrated in Fig. 2 wherein the reference characters T—1 and T—2 designate the first and second towers, respectively. In the first tower T—1, an inlet 1 is provided for a salt solution of a halide of an alkali metal from the second tower. Through a gas inlet 3, the unsaturated and saturated hydrocarbons are introduced into the first tower. The solution and the product are removed from the tower via an outlet 4. Above the outlet and in the bottom of the tower is an auxiliary gas inlet 5. At the top of the first tower, a gas outlet 7 is provided to convey the exit gases to the second tower T—2. In the second tower, an inlet 11 is located in the upper part to introduce the fresh salt (NaBr) solution. Into the salt solution, exit or used hydrocarbon gas from the first tower is introduced via gas inlet 12 in the lower part of the tower T—2. An auxiliary gas inlet 13 is likewise incorporated in the lower part of the second tower and positioned above a liquor outlet 14. At the top of tower T—2, a gas outlet 15 is provided from which the exit gases go to washer 8. After passing through the washer, the exit gases are conducted to either the adsorber 9 or adsorber 10.

For the purpose of giving those skilled in the art a better understanding of the invention, the following specific illustrative example will be given in conjunction with Fig. 3.

About 20 to about 40 parts by weight of sodium bromide are added to about 100 parts by weight of water to form a strong or concentrated halide salt solution. In some instances a more or less saturated salt solution is used. Chlorine gas is added to the strong salt solution in excess of stoichiometric quantities. In other words, sufficient chlorine is added to convert and liberate substantially all of the bromide in the salt solution into free bromine and to combine with said free bromine to form bromine chloride. By this treatment, the usual brown color of a bromine-containing solution disappears. This is in contrast to prior procedures in which brown bromine-containing solutions were utilized.

The strong salt solution or liquor containing sodium chloride and bromine chloride is cooled to about 10° C. or 20° C. and is added to a saturator, preferably a darkened and water jacketed tower of the type described hereinabove. Through the solution unsaturated and saturated hydrocarbon gas is introduced, preferably through a perforated plate or body of porcelain, earthenware, "Filtros", or fritted glass or other solid having an abundance of small pores. The gas passes upwardly and countercurrent to the downward flowing solution. Although any gas containing unsaturated hydrocarbons may be used, satisfactory results have been obtained with gas from petroleum vapor phase cracking systems which contains principally saturated hydrocarbons and unsaturated hydrocarbons including ethylene, propylene, butylene, amylene, acetylene, methyl acetylene or alkylenes, etc. In the tower the unsaturated hydrocarbons are halogenated. Thus, ethylene is halogenated to ethylene brom-chloride or ethylene dichloride or ethylene dibromide and acetylene to acetylene dibromide dichloride or other acetylene tetrahalide. If the aqueous solution is dilute, substantial amounts of ethylene bromhydrin or ethylene chlorhydrin will be formed by the addition of the hydrolyzed halide (HOBr or HOCl) to the ethylene. The remaining or unused gas consists principally of saturated hydrocarbons. Some free halogens (bromine, chlorine and bromine chloride) and the vapors of the hydrocarbon halides (ethylene bromide, etc.) may also be present in the unused or exit gas. This gas is first washed with an alkaline solution, such as caustic soda solution, etc., to remove and recover the free halogens for reuse. From the washer, the gas is passed through an adsorber containing activated carbon which will adsorb and recover hydrocarbon halides. In the event any free halogens are still present, they will likewise be adsorbed. In practice, the following types of adsorbent material may be used: activated carbons, silica gels, or zirconia gels, but of these, activated carbons are preferred.

From the tower, the solution is withdrawn via an automatic decanter which separates the product and the salt solution. The product may then be subjected to distillation and separated into its components. After distillation, the distilled products, such as ethylene brom-chloride, ethylene-dibromide, proplyene brom-chloride, etc., may be used, shipped, etc. The salt solution containing principally sodium chloride and ethylene bromhydrin and chlorhydrin is withdrawn to a wooden tank in which it is acidified with some cheap acid like sulfuric acid, etc., to a pH of about 3. By acidifying the solution, glycol [$C_2H_4(OH)_2$] and hydrobromic acid are formed. Bromine may be liberated from this acid by passing chlorine gas through the solution and may be removed by blowing air through the solution. The air carrying the bromine may then be conducted to the alkali absorber or washer where it will be converted into sodium bromide which can be reused. The residual aqueous salt solution containing glycol may be treated for the recovery of the glycol.

I claim:

1. The method of continuously separating unsaturated hydrocarbons from saturated hydrocarbon gases and isolating substantially pure saturated hydrocarbons practically devoid of unsaturated hydrocarbons which comprises establishing an acid solution of sodium bromide, continuously passing chlorine gas through said solution in amounts in excess of stoichiometric quantities to liberate bromine from the bromide in said solution and to form bromine chloride, continuously contacting a gas containing saturated and unsaturated hydrocarbon gases with said solution whilst moving to cause said unsaturated hydrocarbons to react with said bromine chloride to form brom-chlor hydrocarbons, continuously removing said brom-chlor hydrocarbons from the solution to facilitate the recovery of hydrocarbon halide, continuously passing the unreacted gas through an alkali washer for the recovery of free halogens, and continuously bringing the residual gas into contact with an adsorbent material for the absorption of halogenated hydrocarbons and for the isolation of substantially pure saturated hydrocarbons practically devoid of unsaturated hydrocarbons.

2. The method of continuously separating unsaturated hydrocarbons from saturated hydrocarbon gases and isolating substantially pure saturated hydrocarbons practically devoid of unsaturated hydrocarbons which comprises establishing a flowing solution containing about 10 to about 20 parts by weight of sodium bromide and about 100 parts by weight of water, continuously passing chlorine gas through said solution in amounts in excess of stoichiometric quantities to liberate bromine from the bromide in said solution and to form bromine chloride, cooling said solution to about 10° C. to about 20° C., continuously contacting a gas containing saturated and unsaturated hydrocarbon gases with said flowing solution to cause said unsaturated hydrocarbons to react with said bromine chloride to form brom-chlor hydrocarbons, continuously removing said brom-chlor hydrocarbons from the solution to facilitate the recovery of hydrocarbon halide, continuously passing the unreacted gas through an alkali washer for the absorption of free halogens, and bringing the residual gas into contact with an adsorbent material for the recovery of halogenated hydrocarbons and for the isolation of substantially pure saturated hydrocarbons practically devoid of unsaturated hydrocarbons.

3. The method of continuously separating unsaturated hydrocarbons from saturated hydrocarbon gases and forming substituted derivatives of saturated hydrocarbons from unsaturated constituents which comprises establishing a solution of sodium bromide, continuously passing chlorine gas through said solution in amounts in excess of stoichiometric quantities to liberate bromine from the bromide in said solution and to form bromine chloride, continuously contacting a gas containing saturated and unsaturated hydrocarbon gases with said solution whilst flowing to cause said unsaturated hydrocarbons to react with said bromine chloride to form brom-chlor hydrocarbons, continuously removing said brom-chlor hydrocarbons from the solution to facilitate the recovery of hydrocarbon halide, acidifying the residual solution to a pH of about 3 and heating said solution to about 80° C. to effect hydrolysis of any hydrins to glycols.

4. The method of continuously separating unsaturated hydrocarbons from saturated hydrocarbon gases and isolating substantially pure saturated hydrocarbons practically devoid of unsaturated hydrocarbons which comprises establishing a downward flowing solution containing sodium bromide, continuously passing chlorine gas upward through said flowing solution in amounts in excess of stoichiometric quantities to liberate bromine from the bromide of said flowing solution and to form bromine chloride, continuously bringing a gas containing unsaturated and saturated hydrocarbons in contact with said flowing solution to cause unsaturated hydrocarbons to react with free halogens including said bromine chloride and to form halogenated hydrocarbons, continuously separating said halogenated hydrocarbons from said flowing solution, continuously passing the unreacted gas through an alkali solution for the absorption of free halogens, and continuously bringing residual gas into contact with adsorbent material for the recovery of halogenated hydrocarbons and for the isolation of substantially pure saturated hydrocarbons practically devoid of unsaturated hydrocarbons.

5. The method of continuously separating unsaturated hydrocarbons from saturated hydrocarbon gases and isolating substantially pure saturated hydrocarbons practically devoid of unsaturated hydrocarbons which comprises establishing a downward flowing solution containing about 10 to 40 parts by weight of sodium bromide and about 100 parts by weight of water, continuously passing chlorine gas upward through said flowing solution in amounts in excess of stoichiometric quantities to liberate bromine from the bromide of said flowing solution and to form bromine chloride, continuously bringing a gas containing unsaturated and saturated hydrocarbons in contact with said flowing solution to cause unsaturated hydrocarbons to react with free halogens including said bromine chloride and to form halogenated hydrocarbons, separating said halogenated hydrocarbons from said solution, continuously passing the unreacted gas through an alkali solution for the absorption of free halogens, and continuously bringing residual gas into contact with adsorbent material for the recovery of halogenated hydrocarbons and for the isolation of substantially pure saturated hydrocarbons practically devoid of unsaturated hydrocarbons.

6. The method of continuously separating unsaturated hydrocarbons from saturated hydrocarbon gases and isolating substantially pure saturated hydrocarbons practically devoid of unsaturated hydrocarbons which comprises establishing a downward flowing solution containing sodium bromide, continuously controlling the temperature of said solution to about 10° C. to about 20° C., continuously passing chlorine gas upward through said flowing solution in amounts in excess of stoichiometric quantities to liberate bromine from the bromide of said flowing solution and to form bromine chloride, continuously bringing a gas containing unsaturated and saturated hydrocarbons in contact with said flowing solution to cause unsaturated hydrocarbons to react with free halogens including said bromine chloride and to form halogenated hydrocarbons, continuously separating said halogenated hydrocarbons from said flowing solution, continuously passing the unreacted gas through an alkali solution for the absorption of free halogens, and continuously bringing residual gas into contact with adsorbent material for the recovery of halogenated hydrocarbons and for the isolation of substantially pure saturated hydrocarbons practically devoid of unsaturated hydrocarbons.

7. The method of continuously separating unsaturated hydrocarbons from saturated hydrocarbons gases and forming substituted derivatives of saturated hydrocarbons from unsaturated constituents which comprises establishing a downward flowing solution containing sodium bromide, continuously passing chlorine gas upward through said solution in amounts in excess of stoichiometric quantities to liberate bromine from the bromide of said solution and to form bromine chloride, continuously bringing a gas containing unsaturated and saturated hydrocarbons in contact with said flowing solution to cause unsaturated hydrocarbons to react with free halogens including said bromine chloride and to form halogenated hydrocarbons, continuously separating said halogenated hydrocarbons from said solution, acidifying the solution to a pH of about 3 and heating to about 80° C. to cause the hydrolysis of hydrins to glycols.

8. The method of continuously separating unsaturated hydrocarbons from saturated hydrocarbon gases and forming substituted derivatives of saturated hydrocarbons from unsaturated constituents which comprises establishing a downward flowing solution containing sodium bromide, continuously passing chlorine gas upward through said solution in amounts in excess of stoichiometric quantities to liberate bromine from the bromide of said solution and to form bromine chloride, continuously bringing a gas containing unsaturated and saturated hydrocarbons in contact with said flowing solution to cause unsaturated hydrocarbons to react with free halogens including said bromine chloride and to form halogenated hydrocarbons, continuously separating said halogenated hydrocarbons from said solution, acidifying the solution to a pH of about 3 and heating to about 80° C. to cause the hydrolysis of hydrins to glycols, chlorinating the solution to liberate bromine, continuously blowing air through said solution to remove bromine therefrom, continuously passing said air through an alkali solution to recover the bromine.

9. The method of continuously separating unsaturated hydrocarbons from saturated hydrocarbon gases and isolating substantially pure saturated hydrocarbons practically devoid of unsaturated hydrocarbons which comprises establishing a column of downward flowing solution containing sodium bromide, continuously introducing chlorine gas into the said solution in the lower part of said column to liberate bromine from the bromide from said solution and to form bromine chloride, continuously contacting said flowing solution with a gas containing unsaturated and saturated hydrocarbons in regions containing said bromine chloride to cause a conversion of said unsaturated hydrocarbons to halogenated hydrocarbons, continuously admitting small amounts of said gas in the lower and upper parts of said column to react with free halogens, continuously separating said halogenated hydrocarbons from said solution, continuously passing the unreacted gas through an alkali solution for the absorption of free halogens, and continuously bringing the residual gas into contact with adsorbent material for the recovery of halogenated hydrocarbons and for the isolation of substantially pure saturated hydrocarbons practically devoid of unsaturated hydrocarbons.

10. The method of continuously separating unsaturated hydrocarbons from saturated hydrocarbon gases and isolating substantially pure saturated hydrocarbons practically devoid of unsaturated hydrocarbons which comprises establishing two columns of a downward flowing solution containing sodium bromide, continuously introducing a fresh solution of sodium bromide into the upper part of the second column, continuously introducing chlorine in excess of stoichiometric amounts in the lower part of the first column to liberate bromine from the bromide and to form bromine chloride, continuously passing gas containing unsaturated hydrocarbons from saturated hydrocarbon gases countercurrent to said flowing solution in the first column to cause the formation of halogenated hydrocarbons from unsaturated hydrocarbons, continuously separating the halogenated hydrocarbons from said solution, continuously conveying the unreacted gas from the top of the first column to the lower part of the second tower and permitting said gas to flow upward whereby residual amounts of unsaturated hydrocarbons and halogens including chlorine react in the presence of sodium bromide to form halogenated hydrocarbons, continuously passing unreacted gases through an alkali solution for the absorption of free halogens, and continuously contacting residual gases with adsorbent material for recovery of halogenated hydrocarbons, and to isolate practically pure saturated hydrocarbons substantially devoid of unsaturated hydrocarbons.

11. The improvement in the continuous method of halogenating hydrocarbons and of isolating practically pure saturated hydrocarbons substantially devoid of unsaturated hydrocarbons which comprises establishing a downward flowing column of an acidified solution saturated to sodium bromide, continuously passing chlorine gas upward at a rate sufficient to liberate more than all the bromine from the bromide of said solution and to form bromine chloride, continuously introducing a gas containing unsaturated and saturated hydrocarbons into the lower part of said column and flowing the gas upward to permit reaction of free halogens including bromine chloride with unsaturated hydrocarbons to form halogenated hydrocarbons, continuously admitting a small amount of gas near the bottom of and in the upper part of said column to cause reaction of free halogens and unsaturated hydrocarbons whereby the free halogens are reduced to a negligible amount, and continuously removing the halogenated hydrocarbons from the said solution, and isolating practically pure saturated hydrocarbons substantially devoid of unsaturated hydrocarbons.

12. The continuous method of making alkylene bromchlorides which comprises contacting a stream of hydrocarbons containing alkylene and saturated hydrocarbons with a solution of nascent bromine chloride in an aqueous solution of alkali metal halide.

13. The method of continuously making alkylene bromchlorides which comprises contacting a stream of hydrocarbons containing alkylene and saturated hydrocarbons with a moving solution of nascent bromine chloride in an acidified aqueous solution of alkali metal halide.

14. The method of continuosly making alkylene bromchlorides which comprises contacting a stream of hydrocarbons containing alkylene and saturated hydrocarbons with a flowing solution of nascent bromine chloride having a bromine content above 4% in an aqueous solution of alkali metal halide.

RALPH H. McKEE.